United States Patent [19]

Ulrich et al.

[11] Patent Number: 4,679,865

[45] Date of Patent: Jul. 14, 1987

[54] RELAY VALVE DEVICE

[75] Inventors: Helmut Ulrich, Springe; Peter Bartscher, Hanover, both of Fed. Rep. of Germany; Brian Shilton, Leicestershire, England

[73] Assignee: WABCO Westinghouse Fahrzeugbremsen GmbH, Hanover, Fed. Rep. of Germany

[21] Appl. No.: 849,661

[22] Filed: Apr. 9, 1986

[30] Foreign Application Priority Data

Apr. 13, 1985 [DE] Fed. Rep. of Germany ....... 3513292

[51] Int. Cl.$^4$ .................. B60T 15/06; B60T 15/18; F15B 11/02
[52] U.S. Cl. ........................................ 303/52; 303/40; 303/84 R
[58] Field of Search .................... 303/50–56, 303/7, 28, 29, 30, 40, 68, 22, 84; 137/627.5; 188/151 A, 195

[56] References Cited

U.S. PATENT DOCUMENTS

| | | | |
|---|---|---|---|
| 3,941,432 | 3/1976 | Blanz | 303/52 |
| 3,992,065 | 11/1976 | Pekrul | 303/52 X |
| 4,116,492 | 9/1978 | Reinecke | 303/52 X |
| 4,418,965 | 12/1983 | Reinecke | 303/40 X |
| 4,498,710 | 2/1985 | Smith | 303/52 X |
| 4,575,157 | 3/1986 | Reinecke | 303/40 |
| 4,609,230 | 9/1986 | McCann | 303/52 |

*Primary Examiner*—Douglas C. Butler
*Attorney, Agent, or Firm*—J. B. Sotak

[57] ABSTRACT

A relay valve device having a first control surface and a second control surface. A shut-off device is located in the line feeding the control pressure into the second control surface throughout the period in which a signal pressure is present, and connecting the second control surface to atmosphere at other times. Thus, the relay valve device releases a greater pressure into a load circuit when actuated during effectiveness of the signal pressure than while the signal pressure is not effective. The shut-off device having a pressure relief valve with a switch-off device so that when the signal pressure is effective, the switch-off device switches OFF the pressure relief function of the pressure relief valve and so that when the signal pressure is not effective, the pressure relief valve is opened as long as the control pressure remains below the relief pressure and is closed when the control pressure moves above the relief pressure.

14 Claims, 4 Drawing Figures

RELAY VALVE DEVICE

FIELD OF THE INVENTION

This invention relates to a relay valve device and, more particularly, to a dual-circuit brake valve for a motor vehicle brake system which is actuated by compressed air pressure.

BACKGROUND OF THE INVENTION

In certain vehicle brake systems, such as shown and disclosed in U.S. patent application Ser. No. 789,692, filed Oct. 21, 1985, it is necessary to employ a relay valve apparatus which has a first characteristic line for the pressure released into a load circuit while the signal pressure is in effect, and which has a second characteristic line inclined towards lower pressure values for the remaining time. For a relay valve apparatus having a relay piston with two control surfaces, the principal application proposes to render the second control surface ineffective while the signal pressure is not effected by activating a shut-off apparatus which is installed in a pressure connection between the control surfaces.

The principal application has the disadvantage that when the pressure released into the load circuit and follows the second characteristic line, the response resistance which is caused by friction and/or the forces of reset springs between parts moving in relation to each other can only be overcome with increased control pressure.

OBJECTS AND SUMMARY OF THE INVENTION

Accordingly, it is an object of this invention to provide a simple means to improve a relay valve apparatus for reliably overcoming the response resistance with low control pressure.

Another object of this invention is to provide an improved relay valve device for a pressure system which releases a pressure dependent on a control pressure from a supply source into a load circuit comprising, an intake valve linking the supply source to the load circuit, a discharge valve linking the load circuit to atmosphere, a relay piston for the actuation of the intake and discharge valves, the relay piston has a first control surface which is open to the control pressure and a second control surface, the relay piston has a reaction surface which is open to the pressure of the load circuit, the relay piston is located in such a way that it is open to the control pressure in opening direction of the intake valve and in closing direction of the discharge valve and to the pressure of the load circuit in opening direction of the discharge valve and in closing direction of the intake valve, the second control surface is open to the control pressure, a line feeding the control pressure into the second control surface and a shut-off device are controlled by the condition of a signal pressure and which is used throughout the period in which the signal pressure is present, the shut-off device includes a pressure relief valve and a switch-off device, the pressure relief valve is constructed in such a way that during a malfunction of the signal pressure, it shuts OFF the lines feeding control pressure into the second control surface when the control pressure reaches the value of the relief pressure, and the switch-off device is constructed in such a way that it switches OFF the pressure relief function of the pressure relief valve while the signal pressure is present.

The present invention divides the second characteristic line into two phases, and the second control surface is opened to the total control pressure in the first phase and to a generally restricted control pressure in the second phase.

A relay valve apparatus of this kind can be developed by simple means in the form of a dual-circuit brake valve device by releasing into it, the brake pressure of the first brake pressure circuit as a function of control pressure. In such a case, the second brake circuit is the load circuit of the relay valve device, and the pressure released by the relay valve device is the second brake pressure.

In the present invention, it is not important whether the sum of the first and the second control surfaces of the relay piston is equal to, smaller than, or greater than the reaction surface of the piston. That is, it is not important whether along the first characteristic line, the pressure released into the load circuit or the second brake pressure is equal to, smaller than (step-down), or greater than (step-up) the control pressure or the first brake pressure.

The size of the first control surface in relation to the size of the reaction surface is equally unimportant for the subject invention. The first control surface may be smaller than, greater than, or equal to the reaction surface. In the first case, the pressure released into the load circuit or the second brake pressure may be stepped-up, equal, or stepped-down in relation to the control pressure or the first brake pressure along the first characteristic line, depending on the relation of the sum of the first and second control surfaces; while the above-named pressures along the second characteristic line are stepped-down in relation to the control pressure, or the first brake pressure. In the third case, the above-named pressures are stepped-up along the first characteristic line, and are of equal value along the second characteristic line in relation to the control pressure or the first brake pressure.

By integrating the shut-off apparatus into the relay valve device or into the brake valve apparatus, a compact and cost-effective construction can be achieved. However, is it understood that the shut-off device can also be an independent component.

The invention can be applied advantageously with the signal pressure in the brake system of a motor vehicle in which the motor vehicle is operated with or without a trailer. Thus, the dual-circuit brake valve device facilitates the release of a higher second brake pressure during operation with a trailer than during operation without a trailer.

Normally, the second brake circuit will be assigned to the rear axle brakes; but, in some applications, the second brake circuit is also assigned to the front axle brakes. Accordingly, the present relay valve device can be applied in either case of this kind with the advantage that it is applicable in any brake circuit, and thus has great flexibility. Also, the presently-disclosed relay valve device is capable of retrofit.

When applied in the brake system of a motor vehicle, as mentioned above, the object of the principal application can have the special disadvantage that, during operation without a trailer, the brakes of the second brake circuit respond later than the brakes of the first brake circuit. This is due to the fact that during operation without a trailer, the response resistance of the brakes of the second brake circuit can only be overcome when a considerable first brake pressure is already present in the frist brake circuit, with the possibility that a noticeable amount of increased brake force results. It is evident that a disadvantage of this kind may lead to uneven brake wear, and thus to uneconomical vehicle application. This disadvantage is also avoided by employing the present invention.

The switch-off device of the shut-off apparatus can be advantageously constructed as the power piston or reverse effective surface of the pressure relief piston of the pressure relief valve. The size of the effective surface of the power piston or of the reverse effective surface of the pressure relief piston must be designed, as far as required by the respective mode of application, in a way that even with adjustable signal pressure the secure switch-off of the pressure relief function of the pressure relief valve is assured.

If the device is constructed as the power piston, the pressure relief spring corresponding to the pressure relief valve can be supported at one end by the power piston and can thus function at the same time as its reset spring.

In another embodiment, the switch-off device can be constructed as a magnet-actuated regulating apparatus with a regulator which is controlled by a pressure switch monitoring the signal pressure. While the signal pressure is in effect, this regulator moves the pressure relief piston of the pressure relief valve into the switch-off position. This regulator also can be reset by the pressure relief valve when the signal pressure ceases.

In the case mentioned above, where the signal pressure indicates whether the motor vehicle is in operation with or without a trailer, it can be of advantage to utilize the supply pressure from the trailer supply lie as signal pressure. In such a case, the power piston or the reverse of the pressure relief piston can be opened directly to the supply pressure from the trailer supply pressure line.

BRIEF DESCRIPTION OF THE INVENTION

The above objects and other attendant features and advantages of the subject invention will become more readily apparent when the following detailed description is considered in conjunction with the following drawings, wherein.

DETAILED DESCRIPTION OF THE INVENTION

Figure 1:
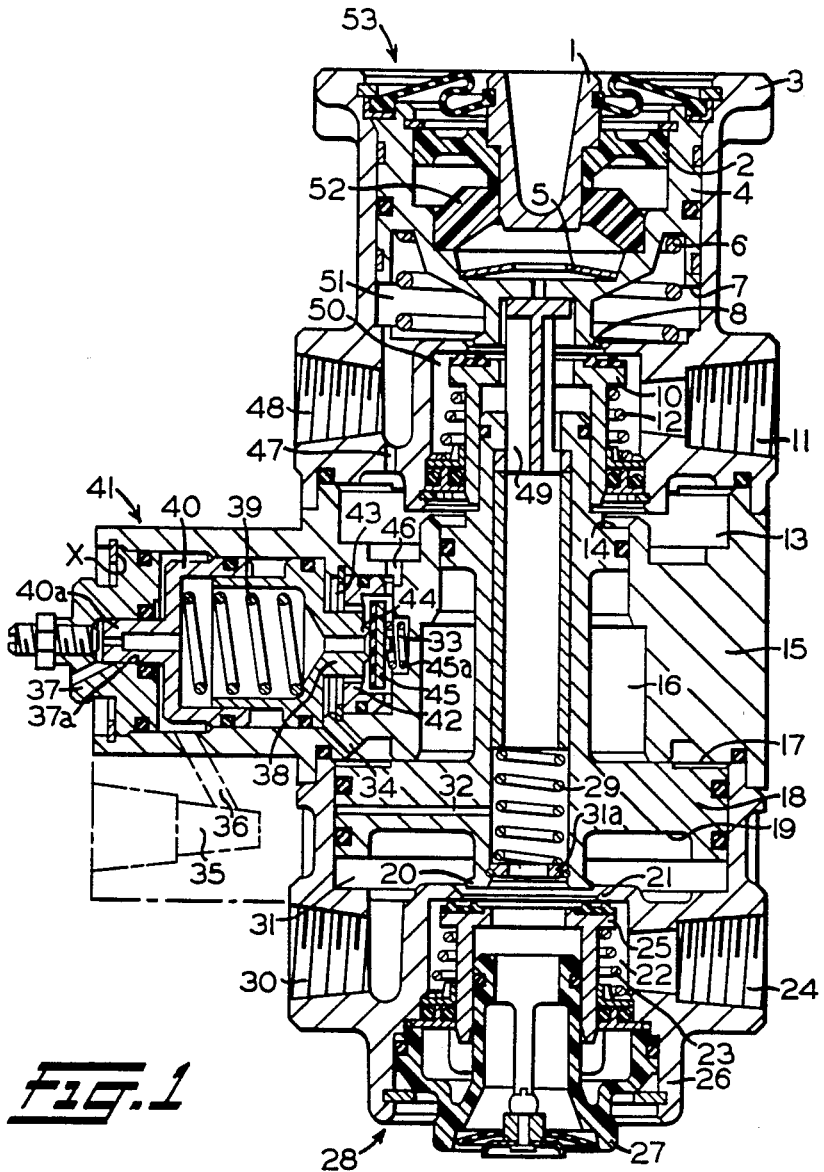
FIG. 1 illustrates a vertical, cross-sectional view of a dual-circuit relay brake valve device of a first embodiment in accordance with the present invention.

Referring now to the drawings, and in particular to FIG. 1, there is shown a brake valve which includes a control valve generally characterized by numeral 53. The control valve 53 includes a first fluid circuit including a shut-off device 41 which acts as a pressure relief valve having a switch-off device. Relay valve 28 includes a second fluid circuit which acts together with the first fluid circuit to form a dual-circuit brake valve device. The valve body includes an upper housing portion 3, an intermediate housing portion 15, and a lower housing portion 26.

The control valve 53 includes a first valve body 10 which is sealed in the upper housing portion 3 and is longitudinally movable as viewed in FIG. 1. The valve body 10 cooperates with an intake seat 9 to form a first inlet or intake valve 9, 10. The intake valve 9, 10 cooperates with a first supply chamber 50 which is in communication with a first supply connection 11. A first brake pressure chamber 51 is in communication with a first brake connection 48. The first valve body 10 is biased upwardly by a compression spring 12 which is supported in the upper housing portion 3. Thus, the valve body 10 is forced against the first intake seat 9 and causes the first intake valve 9, 10 to move in the closing direction. As shown, located in coaxial relationship to the first valve body 10, is a graduated piston 4. The piston 4 is suitably sealed and is longitudinally movable in the valve housing. As shown, the underside 7 of a graduated piston 4 projects into the first brake pressure chamber 51. This tappet-like extension of the piston 4 has a first outlet seat 8 which cooperates with the first valve body 10. The upper end of the first valve body 10 and the seat 8 form a first outlet valve 8, 10. As shown, the first valve body 10 is a hollow member.

As shown, a pressure piece 1, 2, including a spring plate 2 and a center plate 1, is placed in a hollow upper area of the graduated piston 4. The pressure piece 1, 2 faces away from the graduated surface 7 and is longitudinally movable in relation to the piston 4. A graduated spring 5, 52 is situated between the pressure piece 1, 2 and the graduated piston 4. In the present instance, the graduated spring 5, 52 includes a rubber or resilient spring 52 and a plate or disk spring 5 which come into effect in the latter actuation phase of the control valve 53. It is evident that the graduating spring may be designed in any other appropriate manner, for example, as a helical or a coil spring.

A coil spring 6 is supported on the upper side of a shoulder of the upper housing portion 3 and is caged by an undercut annular groove formed adjacent the graduated surface 7. Thus, the spring 6 is located in the first brake pressure chamber 51. The compression spring 12 biases the graduated piston 4 in its opening direction of the first outlet valve 8, 10 and ensures that the first outlet valve 8, 10 is normally open during the time that the control valve 53 is inactive.

The relay valve 28 includes a second valve body 25 which is sealed and is longitudinally movable in the lower housing portion 26. A relay piston 18 is located in the intermediate housing portion 15 and in the lower housing portion 26. The relay piston 18 is suitably sealed and is longitudinally movable in the two housing portions. It will be seen that valve body 25 and piston 18 are situated in coaxial relationship with the control valve 53.

As shown, a second inlet or intake seat 21 is located in the lower housing portion 26 and cooperates with the second valve body 25 to form a second inlet or intake valve 21, 25 which interconnects a second supply chamber 24 with a second brake pressure chamber 31, which are both situated in the lower housing portion 26. A second supply connection 24 is in communication with the second supply chamber 22 and a second brake connection 30 is in communication with the second brake pressure chamber 31, which are all located in the lower housing portion 26. The second valve body 25 is hollow member which is biased upwardly by a spring 23. That is, the spring 23 is located in the lower housing portion 26 and urges the valve 25 against the second intake seat 21, toward the closing direction of the second intake valve 21, 25. A vent or exhaust valve 27 is situated in the open-ended cover of the lower housing portion 26. The vent valve 27 includes a nipple or short pipe (not characterized) in the interior of the second valve body 25. As shown, the second valve body 25 is suitably sealed and is longitudinally movable relative to valve 27 and lower housing portion 26.

The relay piston 18 is situated above the second valve body 25 in coaxial alignment or relationship thereto. The relay piston 18 includes an influential underside which functions as reaction surface 19 which is in communication with the second brake pressure chamber 31. The bottom end of piston 18 is encircled by a pair of O-rings (not characterized) which are sealed against the inner surface of the lower housing portion 26 near the reaction surface 19. As shown, adjacent the inner surface of the reaction surface 19 and extending in the direction of the second valve body 25, the relay piston 18 has a tappet-like extension (not characterized). A second discharge seat 20 cooperates with the second valve body 25 to form a second discharge valve 20, 25. The upper portion of the relay piston 18 is constructed as a graduated piston. The relay piston 18 borders with its small graduated surface, which functions as first control surface 14. A first control chamber 13 is formed between the intermediate housing portion 15 and the upper housing portion 3, with a large graduated surface which functions as a second control surface 17. As shown, surface 17 of the relay piston 18 faces a control chamber 16, which is located in the intermediate housing portion 15.

The diameter of the second control surface 17 is equal to the diameter of the reaction surface 19. It is also obvious to one skilled in the art that the diameter of the second control surface can be smaller or greater than the diameter of the reaction surface. It is also obvious that the diameter of the first control surface can be smaller than, greater than, or equal to the diameter of the reaction surface.

The relay piston 18 has the diameter of the first control surface 14 facing in the same direction as the second control surface 17. The outside diameters of the first and second control surfaces 14 and 17 are sealed against the intermediate housing portion 15 by a suitable O-ring (not characterized). It will be seen that, located between the reaction surface 19 and the second control surface 17, the relay piston 18 is provided with a cavity which is generally shown as a radial piston passageway 32.

The relay piston 18 has an upper portion which extends into the hollow central cavity of the first valve body 10 up to the point of the first control surface 14.

The hollow central cavities of the valve bodies 10 and 25 and the hollow interior of the relay piston 18 lead to the vent valve 27 and form a vent channel. The vent channel connects the first brake pressure chamber 31 to atmosphere. Thus, the corresponding discharge valves 8, 10 or 20, 25 are normally open via passageway 32. If a leakage of fluid escapes around the O-ring seals, the fluid can be discharged into the atmosphere via passageway 32; consequently, the fluid circuits absolutely cannot be mixed or intermingled. A pressure tube or piece 49 is situated inside the hollow relay piston 18 and is axially movable in relation to the relay piston 18. The tube 49 is biased upwardly toward the graduated piston 4 by an auxiliary tension spring 29. The spring 29 is supported within the relay piston 18 and is held in place by a retaining or seating ring 31a which is held in place by a split ring in the lower end of the relay piston 18. The split ring may be easily removed when the valve apparatus is not actuated. The upper end of the pressure tube 49 fits into the tappet-like dependent extension of the graduated piston 4 in such a way that it is moved along with the piston 4 as it moves toward the first valve body 10. The upper end of the pressure tube 49 has a ribbed or star-shaped cross-section portion which occupies only a small part of the free cross-section of the interior of the relay piston 18.

As shown, a passageway 47 is formed in the bottom of the upper housing portion 3 to connect or link the first brake pressure chamber 51 to the first control chamber 13. The passageway 47 serves as a control connection for the relay valve 28.

It will be noted that a supply connection, including feed lines 46, 33, 43, and 34, is situated in the intermediate housing portion 3, and joins the first control chamber 13 with the second control chamber 16, and feeds the control pressure into the second control surface 17.

The shut-off device 41 is located in the intermediate housing portion 15 and is situated perpendicular to the axis of control valve 53 and relay valve 28. The shut-off device consists of a pressure relief valve including a two-way valve 42, 44, 45, a pressure relief piston 38, and a pressure relief spring 39, as well as a switch-off device with a power piston 40.

The two-way valve 42, 44, 45 consists of a valve body 45, a fixed intake seat 42, and a discharge seat 44 formed on a hollow tappet-like extension of the pressure relief piston 38 which extends into the intake seat 42. The valve body 45 forms an intake valve 42, 45 with the intake seat 42, as well as a discharge valve 44, 45 with the discharge seat 44. The valve body 45 is biased toward the valve seat 42, 44 by a compression spring 45a. The two-way valve divides the feed lines 45, 33, 43, 34 into a control pressure area 46, 33 and a relief pressure area 43, 34. In the relief pressure area 43, 34, a chamber 43 is situated, which borders the reverse side of the pressure relief piston which faces away from the chamber 43 and the power piston 40 located coaxial to pressure relief piston 38. The piston 40 is suitably sealed in the intermediate housing portion 15. The sealed power piston 40 includes a hollow tube-shaped extension portion 40a, which extends into a central hole formed in a cover member 37. The cover 37 closes the intermediate housing portion 15 and contains a vent hole 37b. The power piston 40 is actuated by a signal pressure, which is connected to a control or signal connection 35, and a control or inclined passageway 36 formed on its piston actuating surface which faces toward the cover 37. The control or signal connection 35 and the passageway 36 are shown as offset in relation to each other in FIG. 1 of the drawings.

The pressure relief spring 39 is located between the reverse sides, which are not exposed, to the pressure forces. Thus, the power piston 40 and the pressure relief piston 38 are biased in opposite directions. While the discharge valve 44, 45 is open, the hollow extensions of the pistons 38, 40, the space of the pressure relief spring 39, and the vent hole 37b in the cover 37 couple the relief pressure area 43, 34 of the supply line and thus the second control chamber 16 is vented to the atmosphere.

The spring tension of the pressure relief spring 39, and thus the relief pressure of the pressure relief valve, can be regulated by an adjustable screw 38a, which is screwed into a threaded hole drilled into the end of the cover member 37. As an alternate or auxiliary adjustment, regulator disks or spacer washers may be inserted at point "X", between the cover 37 and the housing, which determines an initial axial position. As another alternative, the cover 37 can be screwed into the intermediate housing portion 15, which is suitably sealed and for regulating in an axial direction.

In the following functional description, it is assumed that the dual-circuit brake valve apparatus is installed in a motor vehicle brake system (not shown).

In this case, the control valve 53 is connected to a first supply reservoir via the first supply connection, and is connected to a front axle brake circuit via the first brake connection 48. The depressible pressure piece 1, 2 is linked to a brake pedal either directly or indirectly via a suitable lever linkage.

The relay valve 28 is connected to a second supply reservoir via the second supply connection 24, and is connected to a rear axle brake circuit via the second brake connection 30.

The shut-off device 41 is connected to a point in the trailer supply line via the signal connection, which includes a trailer pressure supply reservoir during operation with the trailer, and which is vented to atmosphere during operation without a trailer.

As previously noted, such an installation is common in the automotive industry. However, in some installations, it is also common where it is permissible to interconnect the second supply connection 24 to the first supply connection. The brake circuits are also often connected in an arrangement opposite to that described above.

Initially, let us assume that the motor vehicle is being operated with a trailer, Under such an assumption, the piston surface of the power piston 40 is opened, via the signal connected 35, to the trailer supply pressure which pushs the piston 40 against the force of the pressure relief spring 39 which, in turn, pushes against the pressure relief piston 38. The piston is urged along into the switch-off position against a housing stoip. In the switch-off position, the discharge valve 44, 45 is constantly open. Thus, the first and the second control chambers 13, 16 are constantly in communication with one another.

When the brake valve device is not actuated, the brake circuits are vented into the atmosphere via the corresponding discharge valves 8, 10, and 20, 25, respectively, and via the vent channel.

Under a nonactuated condition, the biasing spring 6 ensures that the first discharge valve 8, 10 is securely opened, and thus that the front axle brake circuit is securely vented. During actuation of the brake valve device, the function of the biasing spring 6 may be neglected.

During actuation of the brake pedal, the first discharge valve 8, 10 is closed and is connected to the first supply reservoir by opening the first intake valve 9, 10 of the front axle brake circuit. The first intake valve 9, 10 remains open until enough first brake pressure has built up to allow closure of the first intake valve 9, 10 via the graduated surface 7 acting against the actuation force exerted on the brake pedal.

At the same time, the first brake pressure built up in the front axle brake circuit is conveyed from the first brake chamber 51 via the control connection 47 into the first control chamber 13 and from there, via the open intake valve 42, 45 and the feed lines 46, 33 43, 34, into the second control chamber 16.

Because of the cooperative association between the relay piston 28 with the second discharge valve 20, 25 and the second intake valve 21, 25, the first brake pressure causes the relay valve 28 to release sufficient brake pressure into the rear axle brake circuit, so that it balances out the first brake pressure in the control surfaces 14 and 17 of the relay piston 18 via the reaction surface 19. It is apparent to those skilled in the art that the second control surface 17 is only effective with its surface difference to the first control surface 14. It is well known that due to the equal diameters of reaction surface 19 and second control surface 17, the second brake pressure in this embodiment is generally equal to the first brake pressure.

If the sum of the first control surface and the effective surface difference of the second control surface is smaller than the reaction surface, it is evident that the second brake pressure is lower than the first brake pressure. Conversely, if the second brake pressure is greater than the first brake pressure, then the sum of both control surfaces is greater than the reaction surface 19.

In case of a malfunction of the control valve 53 due to the lack of air pressure, i. e., when no first brake pressure builds up in the first brake pressure chamber 51 and in the front axle brake circuit, a functional connection between the graduated piston 4 and the relay piston 28 is established during actuation of the brake pedal. In this case, the graduated piston 4 is moved by the actuation force and carries the first valve body 10 along, until it touches the first control surface 14 of the relay piston with its front surface. Thus, the graduated piston 4, the first valve body 10, and the relay piston 18 functionally are combined into one structural component, which takes the place of the graduated piston 4. This structural component functions in conjunction with the second valve body 25, as well as the second intake valve 21, 25 and the second discharge valve 20, 25 for the rear axle brake circuit connected to the second brake connection 30 in accordance with the functional description given above for the control valve 53, so that the reaction surface 19 takes the place of the graduated surface 7. The same functions are executed when the control valve 53 is under full pressure; i. e., when the full pressure of the first supply pressure is conveyed to the first brake chamber 51 and the actuation force continues to be increased during the push-through-phase.

If the relay valve is constructed in such a way that the sum of the effective control surfaces of the relay piston is smaller than the reaction surface, it is possible, during a malfunction of the control valve due to the lack of air pressure, to increase the second brake pressure up to the amount of the total pressure available in the second supply pressure reservoir, although this is contrary to the normal character of the relay valve. The same is true when the control valve 53 is under full pressure. The above-described operation of pressure increase in the rear axle brake circuit or in the second brake circuit can be of significance, particularly during an emergency when every brake pressure reservoir is to be employed.

Let us now assume that the motor vehicle is placed in operation without a trailer. In this case, only atmospheric pressure is present on the outer side of the piston surface of the power piston 40, so that the power piston 40 is moved by the pressure relief or biasing spring 39 against the cover 37 which functions as a stoip. The piston is held there. However, the pressure relief piston 38 can be released from the switch-off position due to the lessening of biasing force of the pressure relief spring 39. If, in this case, after actuation of the brake pedal, a first brake pressure is introduced into the first control chamber 13 and via the feed lines 46, 33, 43, 34 into the second control chamber 16, then the pressure relief piston 38 is moved by this pressure against the force of the pressure relief spring. Once the first brake pressure has increased to the value of the relief pressure, the pressure relief piston 38 has moved so far that the intake valve 42, 45 closes. The closure of the intake valve 42, 45 separates the second control surface 17 from the continued increase of the first brake pressure. When the first brake pressure is below the relief pressure, the relay valve 28 functions in a first phase; i. e., just as during operation with a trailer. With first brake pressures above the relief pressure, however, the effective surface difference of the second control surface 17 is effective only in accordance with the relief pressure and only the first control surface 14 is fully effective. Consequenlty, in this second phase, the second brake pressure is lower than the first brake pressure and is sufficient to create an equilibrium of forces on the relay piston 18. It will be appreciated that the intake valve 42, 45 remains closed during the second phase. When the actuation force is eliminated, the intake valve 42, 45 remains closed into the first phase, since for valve body 45, the surface which is turned toward the relief pressure area 43, 34 and opened to pressure is smaller than the surface which is turned toward the control pressure area 46, 33. Due to this surface diference, the intake valve 42, 45 opens only when the first brake pressure has fallen below the relief pressure. The discharge valve 44, 45 serves the purpose of avoiding, in the second phase, a pressure increase in the second control chamber 16 above the relief pressure; for example, as a consequence of a leakage between the control chambers 13 and 16.

The second brake pressure is lower during operation without a trailer. The amount of decrease depends on the relationship between the first cointrol surface 14 and the reaction surface 19, or the relationship between the control surfaces.

In certain embodiments in which the first control surface is larger than or equal to the reaction surface, the second brake pressure is greater than or equal to the first brake pressure, respectively, when the motor vehicle is being operated without a trailer. However, it is lower than the second brake pressure released during operation with a trailer.

In order to compensate, at least in general, for the friction of the numerous seals of the relay piston 18, the present invention employs the pressure tube 49 and the auxiliary spring 29. Consequently, a force which supports the force generated by the first brake pressure, is introduced via the pressure tube 49 and the auxiliary spring 29 into the relay piston 18. If the friction mentioned above can be tolerated, the pressure tube 49 and the auxiliary spring 29 can be eliminated. The pressure tube 49 includes the necessary outlets for ensuring the functionality of the vent.

After partial or complete elimination of the actuation force, the operation described above is carried out in a reverse manner.

Figure 2:
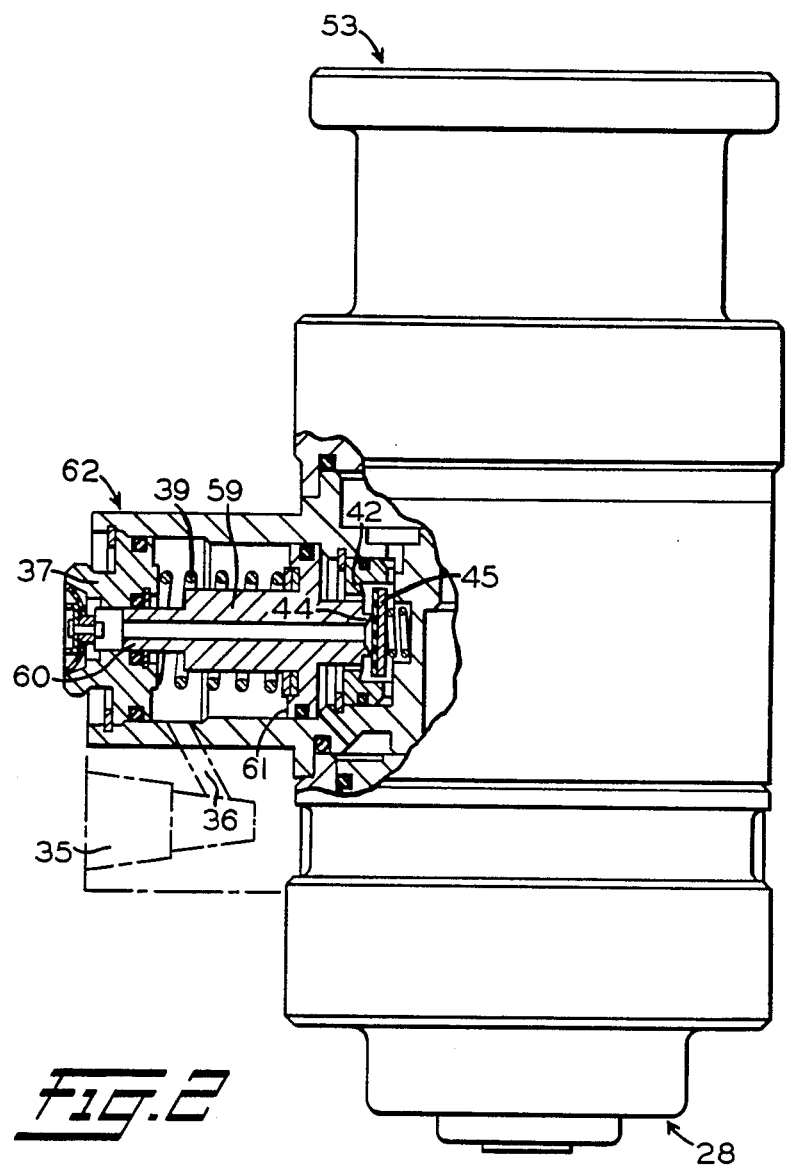
FIG. 2 illustrates a vertical, partial cross-sectional view of a dual-circuit relay brake valve device of a second embodiment of the subject invention.

Referring now to FIG. 2, there is shown another embodiment of a brake valve device. This second embodiment is completely identical to the embodiment of FIG. 1 in regard to the control valve 53 and the relay valve 28. The shut-off device generally depicted by numeral 62 is substantially identical to that of FIG. 1, with the exception that it is on the reverse or opposite side 61. The pressure relief piston 59 is opened by the pressure force of the pressure relief spring 39. The effective surface is so constructed that it can be opened directly by the signal pressure via the signal connection 35 and the passageway 36 formed in the intermediate housing portion 15. For the purpose of connecting the discharge valve 44, 45 to the atmosphere, the pressure relief piston 59 is provided with a tube or fistulous member 60 which extends from the reverse side 61 of the piston 59 and is sealably mounted in the cover 37.

Figure 3:
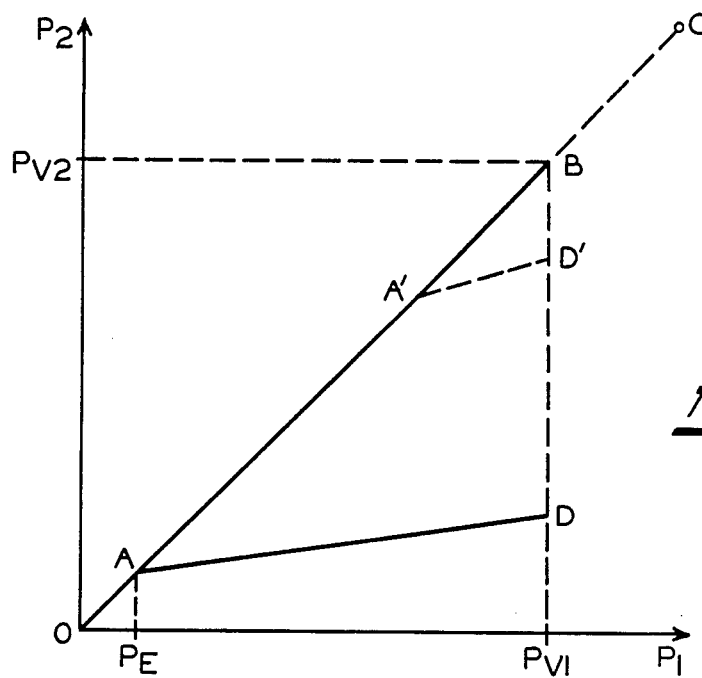
FIG. 3 shows the first and second brake pressure characteristic response curves of the relay brake valve device illustrated in FIGS. 1 and 2.
Figure 4:
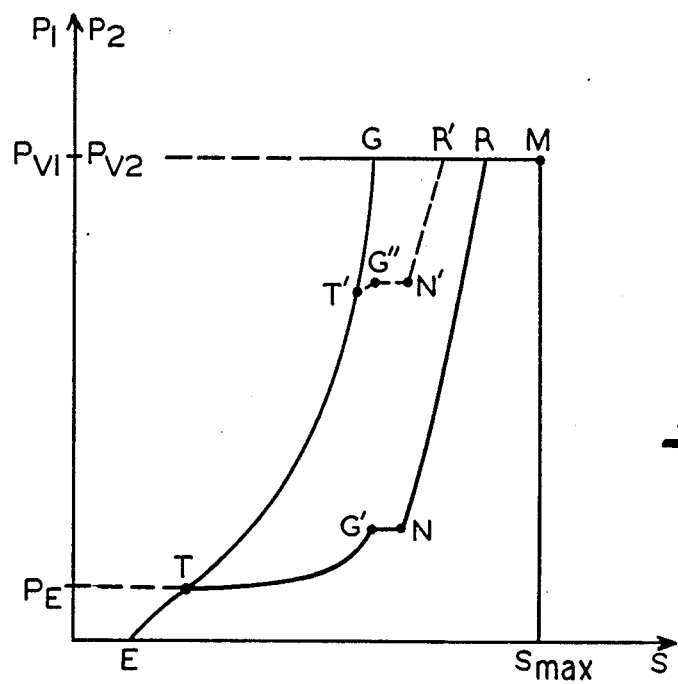
FIG. 4 shows the brake pedal travel versus brake pressure characteristic response curves of the relay brake valve device illustrated in FIGS. 1 and 2.

Referring now to FIGS. 3 and 4, there is shown the characteristic response curves of the two embodiments of FIGS. 1 and 2. The term "graduated" means to cause an increase in control pressure or actuation force or pedal travel which corresponds to an increase in the released pressure.

As shown, FIG. 3 plots the second brake pressure which is symbolized by $P_2$ on the ordinate, and plots the first brake pressure which is symbolized by $P_1$ on the absciss. A line parallel to the oridinate at a distance of $P_{V1}$ symbolizes the pressure of the first pressure supply. Likewise, a line parallel to the absciss at a distances of $P_{V2}$ symbolizes the pressure of the second pressure supply.

It will be understood that equal pressure scales re used for both the ordinate and absciss. A first characteristic line OAB is obtained with operation of the motor vehicle with a trailer and follows a straight line at an angle of 45 degrees in relation to both coordinate axis. This straight line is designated here as segment OC. Along the first characteristic line OAB, the pressure $P_2$ is generally equal to the pressure $P_1$.

The segment OAD designates the normal characteristic line of the two embodiments mentioned above, which is obtained for operation of the motor vehicle without a trailer. Branch OA represents a first phase of operation, and branch AD represents a second phase of operation. the point A designates the relief pressure symbolized by pressure $P_E$ and is located appropriately, by design and/or regulation of the pressure relief spring 39 as well as the size of the surface of the pressure relief piston 38, 59 which is turned toward the chamber 43, in such a way that it is greater than the response pressure of the braking gear of the rear axle brake circuit, in particular the brake cylinder. In practice, values for pressure $P_E$ are between 0.5 bar and 1 bar, i. e., between 7 and 15 psi. have been found to be appropriate.

In the end points B or D, repectively, of the characteristic lines, the first brake pressure corresponds to the pressure of the first supply pressure. At these points, the control valve 53 is under full pressure.

The segment DB designates the slops of pressure $P_2$, which becomes possible when the vehicle is in operation without a trailer, namely, in the push-through-phase, in which there is an additional increase in pedal force or pedal travel after releasing pressure at control valve 53.

With the characteristic curves described above, a smaller brake force is generated in the rear axle brake circuit, which is opened to pressure $P_2$ when a given brake force is applied to the front axle brake circuit during operation of the motor vehicle without a trailer than during operation with a trailer. These characteristic curves can be utilized, for instance, for the brake force to different rear axle loads during operation with or without a trailer; for instance, in articulated road vehicles.

In the embodiment of the relay valve in which the sum of the first and the second control surfaces is smaller than the reaction surface, the first characterisitc line is located below the represented first characteristic line OAB. On the other hand, if the sum of the first and second control surfaces is greater than the reaction surface, then the first characteristic line is located above the represented first characteristic line OAB. If, in this case, the first control surface is larger than or equal to the reaction surface, then the second characteristic line is also located above the represented characteristic line OAB or in the second phase parallel to it, respectively.

Referring now to FIG. 4, thee is shown schematic results of the pedal travel/brake pressure characteristic curves for the embodiments according to FIGS. 1 and 2.

The ordinate plots the first and the second brake pressures, namely, pressures $P_1$ and $P_2$, as well as the supply pressures $P_{V1}$ and $P_{V2}$, and the relief pressure $P_E$; and the absciss plots the pedal travel S of the control valve 53. A line running parallel to the ordinate and through $S_{MAX}$ and across the $P_{V1}$, $P_{V2}$-line M, designates the grestest pedal travel possible on the basis of the geometric measurements of the embodiments according to FIGS. 1 and 2.

The curve ETGM represents, in general, the characteristic responses of both brake circuits after passing through some dead travel during operation with a trailer.

During the operation without a trailer, the same curve remains generally valid for pressure $P_1$, while pressure $P_2$ follows the curve TG'NMR at T. The segment G'N, without pressure increase, corresponds to passing through the lost motion until, as described above, the functional structural component is formed, which consists of the graduated piston 4, the first valve body 10, and the relay piston 18. The following curve NRM represents the remaining spring travel of the graduated spring 5, 52 and the geometrical response which is possible during the remaining travel. The curve G'NRM corresponds to the branch DB of FIG. 3, and thus to the push-through-phase of operation.

This representative curve shows operation without a trailer. Under such a condition, it is possible to raise pressure $P_2$, which may be graduated to the pressure of the second supply pressure $P_{V2}$ during the push-through-phase of operation after releasing the pressure to the control valve at point G'.

As shown in FIGS. 1 and 2, the piston surface 40 and the reverse surface 61 of the pressure relief piston 59 are generally equal to the front of the pressure relief piston 38 and/or 59. Consequently, the presure relief piston 38 or 59 is moved to its pressure relief position when the trailer supply pressure falls below the pressure of the first supply pressure $P_{V1}$, or when the pressure $P_1$ reaches the trailer supply pressure. This restricts the pressure available for the second control chamber 16 generally to the value of the trailer supply pressure. When the trailer supply pressure falls, the characteristic line for the second brake pressure $P_2$ (when operation is with a trailer) enters a second phase of lower pressure, as represented by the line A'D' in FIG. 3 and the curve T'G'N' in FIG. 4. Even with decreased trailer supply pressure, this characteristic of both embodiments assures that the greatest brake forces possible in the trailer and in the rear axle brake circuit of the motor vehicle are balanced, and thus as least provides the tendency to maintain the normal braking behavior of the vehicle.

It is significant to ensure that this also occurs in the second phase, which is followed by a push-through-phase of operation designated in FIG. 3 by the segment D'B' and in FIG. 4 by the curve N'R'M.

In cases where the characteristic described is not considered advantageous, in which trailer supply pressure is decreased, the pressure relief piston can be appropriately measured and held in the switch-off position until the highest admissible decrease of trailer supply pressure is reached. A measure of this kind would be possible by enlarging the piston surface of the power piston or the reverse of the pressure relief piston and/or the reduction of its surface which can be opened to the first brake pressure.

The relay valve 28, in conjunction with the shut-off device 41, 62 of the embodiments described in FIGS. 1 and 2, serve as embodiments for a relay valve device. It is apparent that one skilled in the art need only to imagine that the relay piston 18 is closed at the first control surface 14, that the bottom of the upper housing portion 3 is constructed as a cover member for the intermediate housing portion 15, and that the pressure tube 49 and the auxiliary spring 29 have been removed. If then, any control pressure is fed into the control connection 47, a load circuit is connected to the second brake connection 30, and a supply pressure is connected to the second supply connection 24. Now, if the "second" intake and discharge valves are considered as intake and discharge valves of the relay valve device, then all comments made above on the subject of the relay valve 28 and the shut-off device 41, 62 are valid correspondingly for a valve device of this kind.

It is obvious to those skilled in the art that the two embodiments and applications, which have been represented or mentioned, are not exhaustive and that there are other possible applications for the subject invention. In addition, the invention can be used with liquids or other gaseous pressure media. In these cases, the connections to the atmosphere, which were mentioned above, may have to be replaced by connections to storage areas without pressure, from which the pressure medium can be recovered.

It will be understood that various alterations and changes may be made by those skilled in the art without departing from the spirit and scope of the subject invention. Therefore, it will be appreciated that certain modifications, ramidifications, and equivalents will be readily apparent to a skilled artisan and, accordingly, it is understood that the present invention is not to be limited to the exact embodiment shown and described but should be afforded the full scope and protection of the appended claims.

We claim:

1. A relay valve device for a pressure system which releases a pressure dependent on a control pressure from a supply source into a load circuit comprising, an intake valve linking the supply source to the load circuit, a discharge valve linking the load circuit to atmosphere, a relay piston for the actuation of the intake and discharge valves, the relay piston has a first control surface which is open to the control pressure and a second control surface, the relay piston has a reaction surface which is open to the pressure of the load circuit, the relay piston is located in such a way that it is open to the control pressure in opening direction of the intake valve and in closing direction of the discharge valve and to the pressure of the load circuit in opening direction of the discharge valve and in closing direction of the intake valve, the second control surface is open to the control pressure, a line feeding the control pressure into the second control surface and a shut-off device are controlled by the condition of a signal pressure and which is used throughout the period in which the signal pressure is present, the shut-off device includes a pressure relief valve and a switch-off device, the pressure relief valve is constructed in such a way that during a malfunction of the signal pressure, it shuts OFF the lines feeding control pressure into the second control surface when the control pressure reaches the value of the relief pressure, and the switch-off device is constructed in such a way that it switches OFF the pressure relief function of the pressure relief valve while the signal pressure is present.

2. The relay valve apparatus, according to claim 1, wherein the pressure relief valve consists of a two-way valve controlled by a pressure relief piston having an intake valve and a discharge valve, a second control chamber having a second control surface which is connected via the intake valve or the discharge valve to either the first control chamber of the first control surface or to atmosphere, and the pressure relief piston is adjustable in opening direction of the discharge valve and in closing direction of the intake valve by the control pressure or the relief pressure and in the opposite direction is restricted by a switch-off position in which the intake valve is held open and the discharge valve is closed.

3. The relay valve apparatus, according to claim 2, wherein the switch-off device is constructed as a power piston which can be opened to the signal pressure for moving the pressure relief piston into the switch-off position.

4. The relay valve apparatus, according to claim 3, wherein the pressure relief spring is engageable with the power piston at the end which is opposite from the pressure relief piston so that the power piston is biased against the direction of the signal pressure.

5. The relay valve apparatus, according to claim 2, wherein the reverse surface of the pressure relief piston is opened by the force of the pressure relief spring and is an effective surface which can be opened to the signal pressure to function as a shut-off device.

6. The relay valve apparatus, according to claim 2, wherein the switch-off device is a regulating device which is controlled by a pressure switch monitoring the signal pressure, and functions in such a way that while the signal pressure is present, the regulating device moves the pressure relief piston into the switch-off position.

7. A dual-circuit brake valve apparatus for a motor vehicle brake system which has air pressure actuation comprising, a first circuit is constructed as a control valve which is controlled by a regulating force or distance for releasing a first brake pressure which depends on the magnitude of the regulating force or distance coming out of a first supply source into a first brake circuit, a second circuit is constructed as a relay valve into which the first brake pressure is fed as control pressure for releasing a second brake pressure which depends on the magnitude of the first brake pressure into a second brake circuit, the relay valve has a second intake valve which is connected to the second brake circuit and either to the first supply source or to a second supply source and has a second discharge valve which is connected to the second brake circuit to atmosphere, the relay piston has a first control surface which is opened to the first brake pressure and has a second control surface, the relay piston has a reaction surface which is opened to the second brake pressure, the relay piston is constructed in such a way that it is open to the first brake pressure in opening direction of the second intake valve and in closing direction of the second discharge valve and to the second brake pressure in opening direction of the second intake valve, the second control surface can be opened to the first brake pressure, a line feeding the brake pressure into the second control surface, a shut-off device is constructed in such a way that it operates as a functin of a signal pressure, the shut-off device includes a pressure relief valve and a switch-off device, the pressure relief valve is constructed in such a way that during a malfunction of the signal pressure, it shuts OFF the line feeding control pressure into the second control surface when the control pressure reaches the value of the relief pressure, and the switch-off device is constructed in such a way that it switches OFF the pressure relief function of the pressure relief valve when the signal pressure is present.

8. The dual-circuit brake valve apparatus, according to claim 7, wherein the pressure relief valve includes a two-way valve which is controlled by a pressure relief piston and having an intake valve and a discharge valve, the intake valve or the discharge valve connects either a second control chamber having a corresponding second control surface to a first control chamber having a corresponding first control surface or to atmosphere, the pressure relief piston is constructed in such a way that it is adjustable in opening direction of the discharge valve and in closing direction of the intake valve by the control pressure or the relief pressure and in the opposite direction by a pressure relief spring, while the adjustability in the opposite direction is restricted by a switch-off position in which the intake valve is held open and the discharge valve is closed.

9. The dual-circuit brake valve apparatus, according to claim 8, wherein the switch-off device is constructed as a power piston which can be opened to the signal pressure and which, when opened to the signal pressure, moves the pressure relief piston into the switch-off position.

10. The dual-circuit brake valve apparatus, according to claim 9, wherein the pressure relief spring is engageable with the end which is opposite from the pressure relief piston by the power piston, so that it is being biased against the direction of the signal pressure.

11. The dual-circuit brake valve apparatus, according to claim 8, wherein a reverse surface of the pressure relief piston is biased by the force of the pressure relief spring, and operates an effective surface which can be opened to signal pressure and is constructed as a switch-off device.

12. The dual-circuit brake valve apparatus, according to claim 8, wherein the switch-off device is a regulating device which is controlled by a pressure switch monitoring the signal pressure and functions in such a way that while the signal pressure is present, the regulating device moves the pressure relief piston into the switch-off position.

13. The dual-circuit brake valve apparatus, according to claim 7, wherein the relay valve is constructed in such a way that it can be mechanically actuated by an actuating device of the control valve if not first brake pressure builds up during the actuation of the control valve, or if the control valve continues to be actuated in a push-through-phase operation after the first brake pressure reaches its maximum value.

14. The dual-circuit brake valve apparatus, according to claim 13, wherein the relay valve is constructed to be concentric to the control valve in such a way that a functional connection exists between a regulator piston of the control valve and the relay piston for causing mechanical actuation of the relay valve.

* * * * *

UNITED STATES PATENT AND TRADEMARK OFFICE
CERTIFICATE OF CORRECTION

PATENT NO. : 4,679,865
DATED : July 14, 1987
INVENTOR(S) : Helmut Ulrich, Peter Bartscher, Brian Shilton It is certified that error appears in the above-identified patent and that said Letters Patent are hereby corrected as shown below:

Column 15, line 1, delete "not" and insert --no--

Signed and Sealed this

Twelfth Day of April, 1988

Attest:

DONALD J. QUIGG

*Attesting Officer*    *Commissioner of Patents and Trademarks*